Sept. 1, 1970 JAMES E. WEBB 3,526,580
ADMINISTRATOR OF THE NATIONAL AERONAUTICS
AND SPACE ADMINISTRATION
FLEXIBLE COMPOSITE MEMBRANE
Filed Dec. 19, 1967
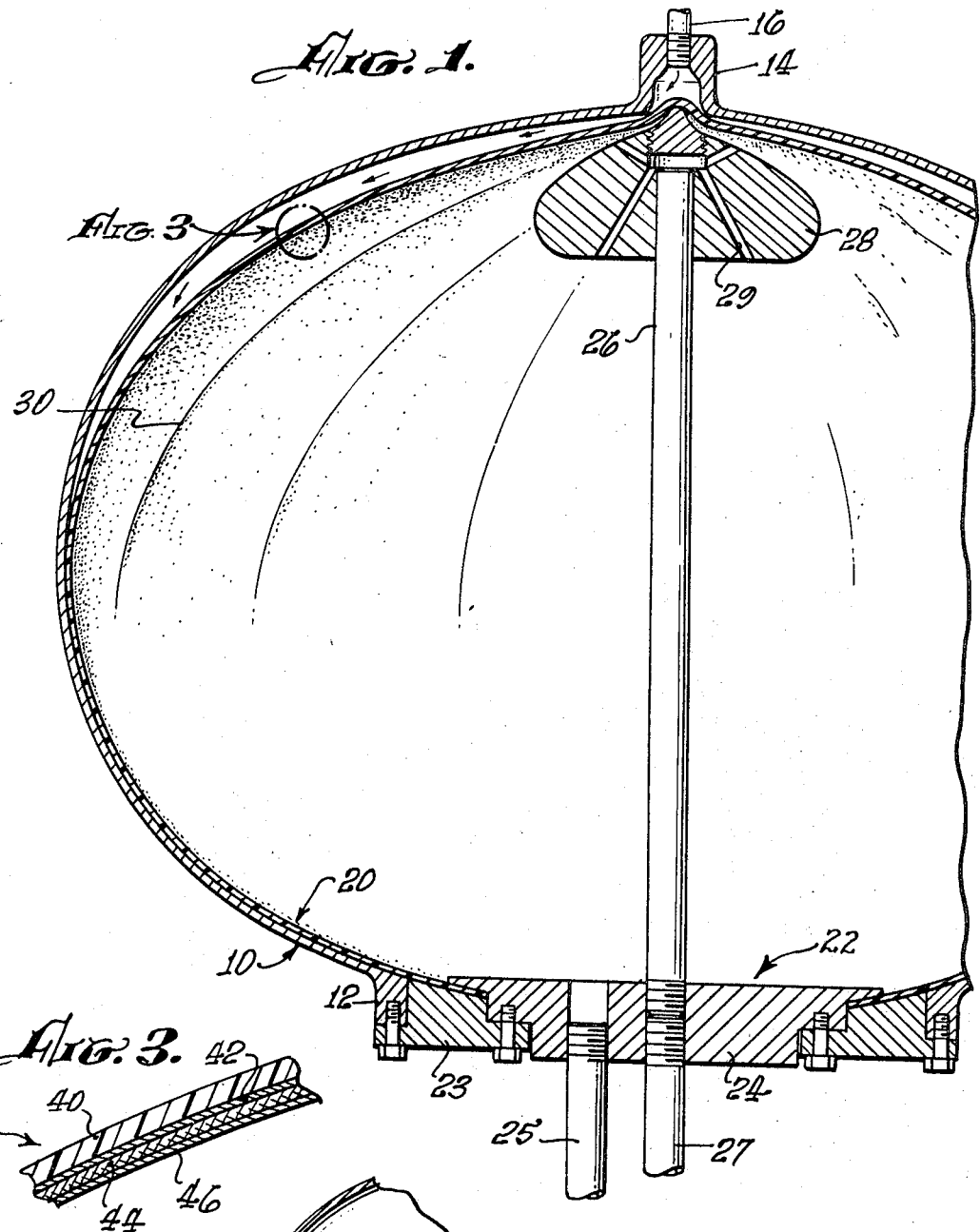
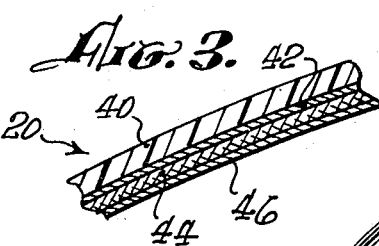
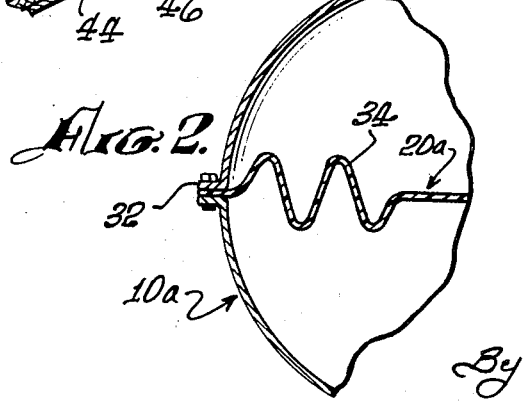
INVENTORS.
STEPHEN P. VANGO,
LOIS L. TAYLOR,
ATTORNEYS.

United States Patent Office
3,526,580
Patented Sept. 1, 1970

3,526,580
FLEXIBLE COMPOSITE MEMBRANE
James E. Webb, Administrator of the National Aeronautics and Space Administration, with respect to an invention of Stephen P. Vango, Los Angeles, and Lois L. Taylor, Pasadena, Calif.
Filed Dec. 19, 1967, Ser. No. 691,736
Int. Cl. C23b 5/60
U.S. Cl. 204—20    5 Claims

ABSTRACT OF THE DISCLOSURE

A chemically stable, completely fluid impervious, flexible membrane is fabricated on a base layer having essentially the chemical and physical characteristics of polymerized tetrafluoroethylene by bonding to a surface of that base a flexible metallic layer, typically of lead. Pores in the metal layer are sealed by application and fusion of indium.

The composite membranes of the invention are particularly useful as expulsion membranes for rocket propellants, since they are impervious to, and chemically compatible with, even such highly reactive oxidizers as nitrogen tetroxide.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention provides a flexible membrane structure that is impervious and chemically inert to a wide variety of fluids, including such highly reactive substances as liquid nitrogen tetroxide, for example.

Description of the prior art

A method for applying an adherent metallic coating to fluorinated ethylene polymers is described in U.S. Pat. 2,898,228 issued to Frank M. Kelley on Aug. 4, 1959 and U.S. Pat. 3,167,491 issued to Harvey M. Harrison et al., on Jan. 26, 1965. The surface of the polymer is treated with a solution of an alkali metal, such as sodium in ammonia, before the metallic coating is applied to the polymer surface. The metallic coating, such as a silver coating, is applied to the treated polymer surface in finely divided colloidal form, such as by the use of various techniques including vacuum metal coating and chemical reduction. The Harrison et al. patent additionally discloses the deposition of a second metal layer such as a nickel layer, electrolytically upon the first metal layer adhering to the treated surface of the fluorinated ethylene polymer.

The formation of a rigid, non-porous, corrosion-resistant metal plate surface by the application of indium to a metal, such as lead, and fusion of the indium, is known in the indium plating art. However, a need exists for a flexible membrane having a surface impervious to fluids and maximum chemical stability in relation to highly reactive chemicals such as nitrogen tetroxide.

OBJECTS AND SUMMARY OF THE INVENTION

Accordingly, it is a primary object of this invention to provide a flexible composite membrane structure which overcomes the disadvantages of prior art structures.

Another object is the provision of a flexible membrane structure which is impervious and chemically stable toward extremely reactive chemicals.

A further object of the invention is the provision of a rocket propellant expulsion membrane which is impervious and chemically stable toward highly reactive oxidizers such as nitrogen tetroxide.

These and other objects of the invention are achieved by providing a flexible composite membrane structure comprising a base layer of polymerized fluorocarbon, such as polymerized tetrafluoroethylene, at least one surface of which has been treated with an alkali metal, such as sodium, dissolved in a solvent, such as liquid ammonia, a thin layer of highly conductive metal, such as silver, adherently applied to the treated surface of the polymerized fluorocarbon, such as by chemical reduction plating, a layer of flexible metal, such as lead, electroplated onto the thin layer of highly conductive metal and a thin layer of indium applied to the layer of flexible metal and fused to form an impervious and chemically stable, flexible composite membrane structure.

The flexible structures of the invention are useful as diaphragms in pressure responsive devices of many kinds, as liners for tanks, as gaskets, and the like.

The invention is especially useful for making expulsion bladders or diaphragms for expelling fluids from tanks in which they are treated or stored. Liquid propellants for the rocket motors of missiles, for example, can be supplied from storage tanks by injecting an expulsion fluid into the tank. For positive control of the propellant delivery, especially under conditions that may include free fall, it is desirable to isolate the expulsion fluid from the propellant by a flexible diaphragm or bladder. In a bi-propellant system the fuel and the oxidizer may be supplied from separate tanks, or from suitable isolated portions of a common tank. Bladder materials for such purposes must be able to withstand the corrosive action of strong oxidizers, must be completely impermeable to such fluids, and must be sufficiently flexible to survive repeated cycles of filling and emptying the container.

The present invention utilizes as a flexible structural base a sheet or film of halogenated polymer having essentially the physical and chemical properties of tetrafluoroethylene (TFE), which is commercially available under the trade name Teflon. Such halogenated polymers are chemically compatible with nitrogen tetroxide but are not impervious to it, the permeability being due both to microscopic pores in the cast or extruded polymer and to the solubility in the polymer of nitrogen tetroxide ($N_2O_4$) or of the nitrogen dioxide ($NO_2$) that is dissolved in it in equilibrium concentration. Such permeation of the polymer is prevented, in accordance with the invention, by applying to at least one face of the polymer base a layer of a suitable metal, typically lead, with the aid of a layer of electrical conducting metal adherent to the base layer, and by rendering the lead fluid-impervious by diffusion of indium into any pores that may be present.

A full understanding of the invention, of its further objects and advantages, and of the manner in which it may be carried out will be had from the following description, which is to be read in conjunction with the accompanying drawing. The particulars of that description are intended only as illustration and not as a limitation upon the scope of the invention, which is defined in the appended claims.

BRIEF DESCRIPTION OF THE DRAWINGS

FIG. 1 is an axial section representing a fluid container embodying an illustrative expulsion membrane in accordance with the invention;

FIG. 2 is a schematic section representing a modification; and

FIG. 3 is a fragmentary section illustrating the membrane structure of the invention at enlarged scale.

DESCRIPTION OF THE PREFERRED EMBODIMENTS

FIGS. 1 and 2 show illustrative configurations in which expulsion membranes may be constructed. In FIG. 1 a generally spherical tank is represented at 10, with neck flange 12 fixedly mounted. That flange provides a relatively wide mouth through which an expulsion bladder and its supporting structure may be inserted into the tank. The relatively small port fitting 14 is provided at the opposite side of the tank, for connection of the conduit 16 through which a pressurized expulsion fluid is supplied under suitable control from a source, not explicitly shown.

Flexible expulsion membrane 20 is formed as a bladder shaped to fit the interior of tank 10 with little or no stretching. Bladder 20 is mounted on support fitting 28 with its mouth clamped in fluid-tight relation between ring 23 and plate 24. Main conduit 25 opens through plate 24 to the interior of the bladder for loading the tank with liquid and for delivery of liquid from the tank when pressure is supplied via conduit 16 to the exterior of the bladder. Plate 24 typically carries tubular mast 26 and fitting 28, which supports the bladder at a point opposite its mouth to control its folding action upon deflation. An early stage of such folding is indicated at 30. Mast 26 also connects the orifices 29 to the external conduit 27 to act as bleed tube for escape of air from the bladder as it is filled with liquid. Two fluids may be stored separately in one tank by providing two bladders, each enclosing approximately half of the tank interior, with separate conduit connections. Both fluids may then be expelled simultaneously by pressurization of the space surrounding the bladders.

In the modification shown in FIG. 2, the tank 10a is constructed as two mating portions with connecting flanges at 32. Fluid connections to the tank are omitted to simplify the drawing. The flexible membrane 20a is generally hemispherical in form, with its periphery clamped between the flanges 32. The membrane is typically pre-formed with circular convolutions 34, which facilitate its deflection upward or downward from the position shown, to substantially fit against the upper or lower hemispherical tank surface. A fluid stored on one side of such a membrane can be expelled by injection of an expulsion fluid on the other side. Two such membranes may be mounted in closely spaced parallel relation, with two fluids stored on opposite sides of the pair and expelled simultaneously through respective outlets by fluid injection between them. Whereas the membrane of FIG. 2 is somewhat more easily constructed than that of FIG. 1, the latter has the advantage of isolating the stored fluid from the tank walls.

The structures of FIGS. 1 and 2 are suitable for containing a liquid rocket fuel such as hydrazine ($N_2H_4$), for example, or an oxidizer such as nitrogen tetroxide ($N_2O_4$). With the modifications that have been described, both fluids of a bi-propellant system can be stored in, and dispensed from, a single tank. A serious difficulty in constructing such propellant systems has been the lack of suitable material for the membrane or bladder.

The present invention solves that problem by utilizing the known flexibility and chemical inertness of fluorinated polymers having essentially the chemical and physical properties of polymerized tetrafluoroethylene (TFE) and by controlling the slight permeability of such polymers by applying a composite coating of an electrical conducting metal and a flexible metal that is positively impermeable to the propellants. Suitable base materials include, for example, in addition to TFE, hexafluoropropylene, copolymers of the latter with TFE (designated FEP), and various composite materials such as a fabric layer of TFE heat bonded to a sheet of FEP. The primary functional components of the applied impermeable coating are a layer of an electrical conducting metal, such as silver, a chemically inert metal, typically lead, and a sealing layer of indium applied to the lead and heat-fused to fill the pores of the lead. Whereas such a coating can be applied to a polymer body of any desired thickness, expulsion membranes commonly utilize a membrane base from about 0.003 to about 0.030 inch thick. A preferred procedure for applying an impermeable coating to a surface of fluorinated polymer is as follows:

The polymer surface is first cleaned in acetone or chloroform with agitation by ultrasonic energy to remove grease, and is rinsed in fresh solvent. The surface is then etched by immersion in a sonically agitated suspension of finely divided sodium or other suitable alkali metal in a suitable liquid medium. A satisfactory etch, indicated by uniform tan color imparted to the polymer surface, is usually produced after several minutes of treatment. The etched surface is rinsed in water and then sonically cleaned in dilute sulfuric acid, distilled water, acetone, benzene, acetone and dried in an oven at 100° C.

The etched and cleaned surface is then coated with silver, or other electrical conducting metal, by the Brashear process of chemical deposition, or other electroless or chemical plating process, the solution being agitated during the coating operation to improve the adhesion of the silver to the surface. The sonic agitation is used only in applying the first coat of silver. The silver coating is repeated as necessary, typically three times, to obtain a coating with adequate electrical conductivity for electroplating purposes. Any silver deposited on unetched portions of the polymer surface is easily rubbed off. Lead is then deposited electrolytically on the silver or other conducting metal coating, to a thickness of from 0.002 to 0.005 inch, typically from a stirred lead fluoroborate bath with a current of about 30 ma./in.$^2$.

The described use of ultrasonic agitation during the etching of the polymer surface with sodium is believed to provide anchor points for the silver film, while the ultrasonic processing during the silver deposition improves the density and adherence of that film. The resulting composite silver-lead coating adheres strongly to the polymer, showing a tensile strength typically of the order of 2000 lbs./in.$^2$ and potentially exceeding that of TFE itself. Hence the coated polymer can be bent and even folded sharply and repeatedly without affecting that bond or rupturing the metal film. The silver-lead film resulting from the above described process typically reduces the permeability of a thin sheet of TFE to nitrogen tetroxide by as much as 1000-fold. However, it has been found that such films occasionally contain microscopic pores, so that the composite structure may still exhibit measurable permeability when exposed to liquid nitrogen tetroxide for periods of the order of days.

This very slight remnant permeability has been successfully eliminated by depositing on the lead surface a film of indium, for example by electrolysis, to a thickness of from 0.001 to 0.005 inch, and preferably about 0.002 inch. The indium film is then fused by heating in vacuum or inert atmosphere the entire assembly to a temperature a few degrees above the melting point of indium (157° C.) but well below the melting point of lead (327° C.) and the decomposition temperature of the polymer (in excess of 350° C. for TFE). The molten indium is rapidly drawn by capillary action into any pores, voids or cracks in the lead film. By continuing such heat treatment the indium can also be caused to diffuse into the solid body of the lead to an extent that is controllable by variation of the length and temperature of the heat treatment.

FIG. 3 represents the composite flexible membrane structure of the invention, with polymer base at 40, bonding silver film at 42, flexible metallic layer at 44 and superposed and fused indium layer at 46. The figure is schematic and is not intended to show the various layer thicknesses to scale.

A particular advantage of the described membrane structure is that membrane sections can be joined by soldering their metallic layers to form an assembly of desired shape.

It is appreciated that those familiar with the art may make modifications and/or substitute equivalents in the arrangement as shown without departing from the spirit of the invention. Therefore, all such modifications and/or equivalents are deemed to fall within the scope of the invention as claimed in the appended claims.

What is claimed is:

1. In a flexible membrane structure, that improvement which comprises:
    a membrane base layer consisting essentially of polymerized tetrafluoroethylene,
    a layer of an electrical conducting metal adhered to the base layer,
    a layer of a flexible, chemically stable metal bonded to a surface of said conducting metal layer and consisting essentially of lead, and
    a layer of indium superposed on said chemically stable metal layer and at least partially diffused into the chemically stable metal layer by fusion to fill pores thereof and to render the membrane structure fluid impermeable.

2. A flexible membrane structure according to claim 1 wherein said chemically stable metal layer is between about 0.002 and about 0.005 inch thick.

3. A flexible membrane according to claim 1 wherein said metal layers consist essentially of lead deposited electrolytically upon an electrically conductive layer of silver which has been deposited from chemical solution upon said surface of the base layer.

4. In a method for preparing a chemically stable, substantially fluid impervious, flexible membrane structure, that improvement which comprises:
    contacting a surface of polymerized tetrafluoroethylene sheet material with a suspension of finely divided sodium in presence of ultrasonic energy to etch said surface,
    chemically depositing silver on said etched surface in presence of ultrasonic energy to form an electrically conductive surface layer, and
    electrodepositing lead on said silver layer to a thickness between about 0.002 and about 0.005 inch.

5. In a method for rendering completely fluid impervious a flexible membrane structure prepared according to claim 4, that improvement which comprises:
    electrodepositing indium on said lead layer to a thickness between about 0.001 and about 0.005 inch, and
    heating the resulting membrane structure to a temperature exceeding the melting point of indium to fuse the indium and thereby seal pores in the lead layer.

References Cited

UNITED STATES PATENTS

| | | | |
|---|---|---|---|
| 2,756,200 | 7/1956 | Houck | 204—37 |
| 3,097,668 | 7/1963 | Langer | 204—20 |
| 3,167,491 | 1/1965 | Harrison et al. | 204—30 |
| 3,304,244 | 2/1967 | Granitsas | 204—20 |

DANIEL E. WYMAN, Primary Examiner

C. F. DEES, Assistant Examiner

U.S. Cl. X.R.

204—30